United States Patent
Yang et al.

(10) Patent No.: US 7,712,627 B2
(45) Date of Patent: May 11, 2010

(54) COVER ASSEMBLY FOR ACCESS OPENINGS

(75) Inventors: Jing Yang, Shenzhen (CN);
Hsuan-Tsung Chen, Taipei Hsien (TW);
Jin-Cai Shan, Shenzhen (CN);
Qing-Hui Mi, Shenzhen (CN);
Guang-Yao Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd.., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/168,524

(22) Filed: Jul. 7, 2008

(65) Prior Publication Data
US 2009/0236356 A1 Sep. 24, 2009

(30) Foreign Application Priority Data
Mar. 24, 2008 (CN) .................... 2008 1 0300681

(51) Int. Cl.
*B65D 43/16* (2006.01)
*E05D 3/18* (2006.01)
(52) U.S. Cl. .................. 220/830; 220/836; 220/840; 16/357; 16/361
(58) Field of Classification Search .............. 220/830, 220/835, 840, 841, 836, 829; 16/357, 361, 16/297, 356
See application file for complete search history.

(56) References Cited

U.S. PATENT DOCUMENTS

| 1,195,085 | A | * | 8/1916 | Raber .......................... 16/274 |
| 2,557,048 | A | * | 6/1951 | Haase ......................... 220/830 |
| 2,867,842 | A | * | 1/1959 | Evans .......................... 16/256 |
| 4,069,550 | A | * | 1/1978 | Silk et al. ..................... 16/361 |
| 4,253,568 | A | * | 3/1981 | Long et al. ................. 206/387.1 |
| 4,485,524 | A | * | 12/1984 | Neville ...................... 16/241 |
| 4,799,604 | A | * | 1/1989 | Okojima et al. ............. 220/260 |
| 5,050,270 | A | * | 9/1991 | Burgei et al. .................. 16/298 |
| 5,465,557 | A | * | 11/1995 | Harte .......................... 53/510 |
| 5,815,886 | A | * | 10/1998 | Nishio et al. .................. 16/360 |
| 6,292,981 | B1 | * | 9/2001 | Ford et al. .................... 16/357 |
| 6,519,140 | B1 | * | 2/2003 | Kim et al. ................. 361/679.58 |
| 7,367,638 | B2 | * | 5/2008 | Marroquin et al. .......... 312/322 |

FOREIGN PATENT DOCUMENTS
CN 200520056693.2 7/2006

* cited by examiner

*Primary Examiner*—Anthony Stashick
*Assistant Examiner*—Niki M Eloshway
(74) *Attorney, Agent, or Firm*—D. Austin Bonderer

(57) ABSTRACT

An exemplary cover assembly includes a bezel, and a spring-loaded cover. The bezel includes an opening, a pair of slots, and a pair of pins. The opening is defined in the bezel for accessing a device installed thereto. The slots are defined adjacent opposite ends of the opening respectively. The pins are formed adjacent the slots respectively. The spring-loaded cover covers the opening of the bezel, includes a pair of fixing plates formed thereon slidably received in the slots of the bezel. Each of the fixing plates defines an arcuate groove that slidably receives the corresponding pin of the bezel, where the cover is capable of being pivoted open and shut.

7 Claims, 3 Drawing Sheets

COVER ASSEMBLY FOR ACCESS OPENINGS

BACKGROUND

1. Field of the Invention

The present invention relates to cover assemblies for access openings.

2. Description of Related Art

Data storage devices, such as optical disk drives, are installed in a computer enclosure for communication and processing data. An optical disk drive includes a case and a tray received in the case. The tray can accommodate an optical disk therein. A front bezel is positioned in front of the computer enclosure. An access opening is defined in the front bezel. The tray can be moved into or out of the enclosure through the access opening.

For example, a typical personal computer includes an enclosure for protection of internal devices, such as hard disk drives, compact disk read-only memory (CD-ROM) drives, a motherboard, and the like. To access the CD-ROM drive, an opening is defined in the enclosure. However, contamination often harms the personal computer via the opening.

To address aforementioned problem, an enclosure having a protective cover for the opening is invented.

SUMMARY

An exemplary cover assembly includes a bezel, and a spring-loaded cover. The bezel includes an opening, a pair of slots, and a pair of pins. The opening is defined in the bezel for accessing a device installed thereto. The slots are defined adjacent opposite ends of the opening respectively. The pins are formed adjacent the slots respectively. The spring-loaded cover covers the opening of the bezel, includes a pair of fixing plates formed thereon slidably received in the slots of the bezel. Each of the fixing plates defines an arcuate groove that slidably receives the corresponding pin of the bezel, where the cover is capable of being pivoted open and shut.

DETAILED DESCRIPTION

Figure 1:
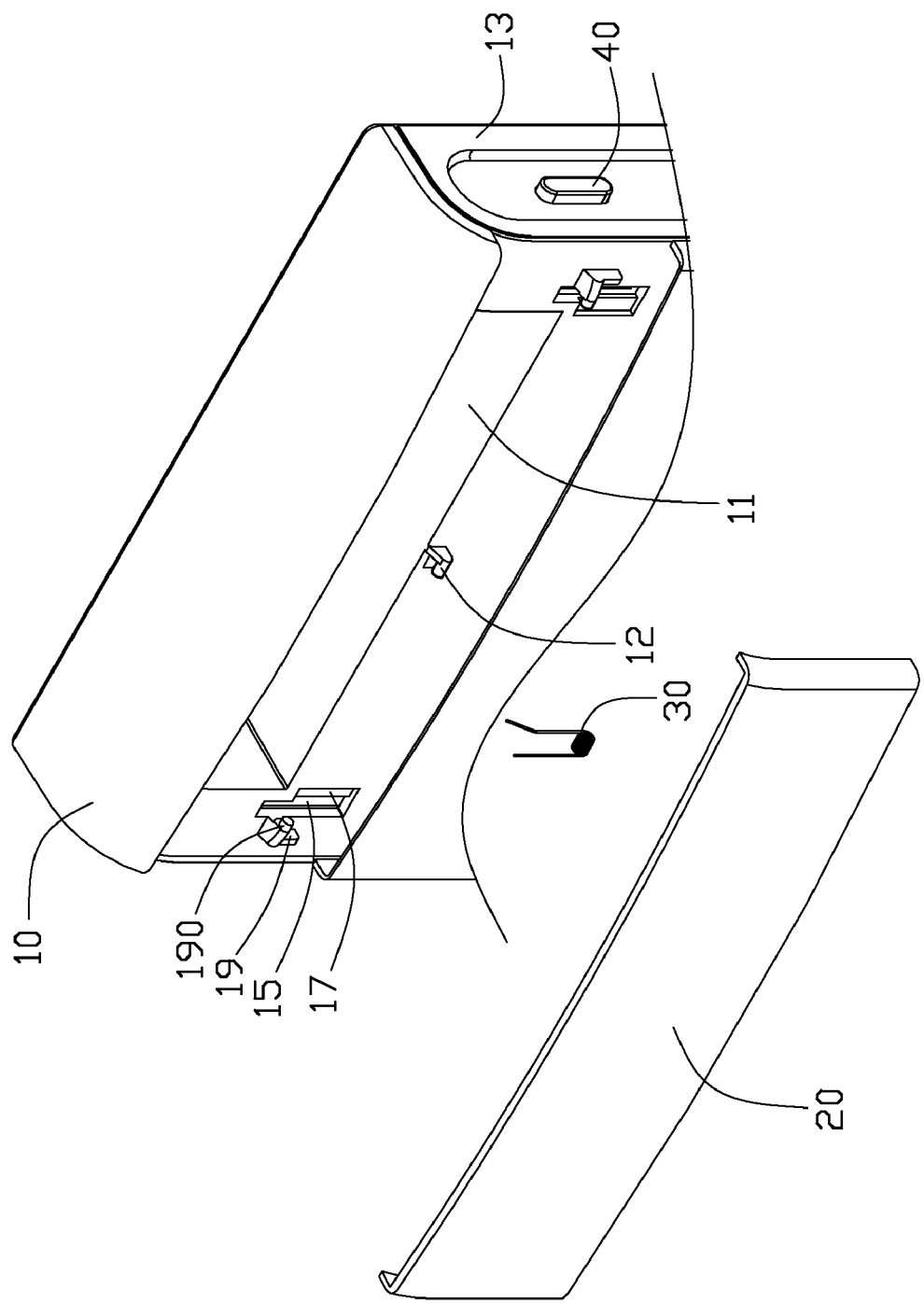
FIG. 1 is an exploded, isometric view of a cover assembly in accordance with an embodiment of the present invention.

Referring to FIG. 1, a cover assembly in accordance with an embodiment of the present invention includes a bezel 10 having a front wall and two sidewalls 13, a cover 20, and an elastic member 30. In this embodiment, the elastic member 30 is a torsion spring having two ends.

The front wall of the bezel 10 defines an opening 11 for accessing a device such as a CD player (not shown), a pair of slots 15 adjacent two ends of the opening 11 respectively, and a pair of depressed portions 17 communicating with the lower parts of the corresponding slots 15. A button 40 extends through a rectangular hole defined in one sidewall 13 of the bezel 10 for controlling the device. A pair of bezel tabs 19 extends from the front wall beside the corresponding sidewalls 13 of the bezel 10 respectively, and two opposite pins 190 extend from the corresponding bezel tabs 19 respectively. A bezel post 12 extends from the bezel 10 below the opening 11, and is generally midway between the pins 190.

Figure 2:
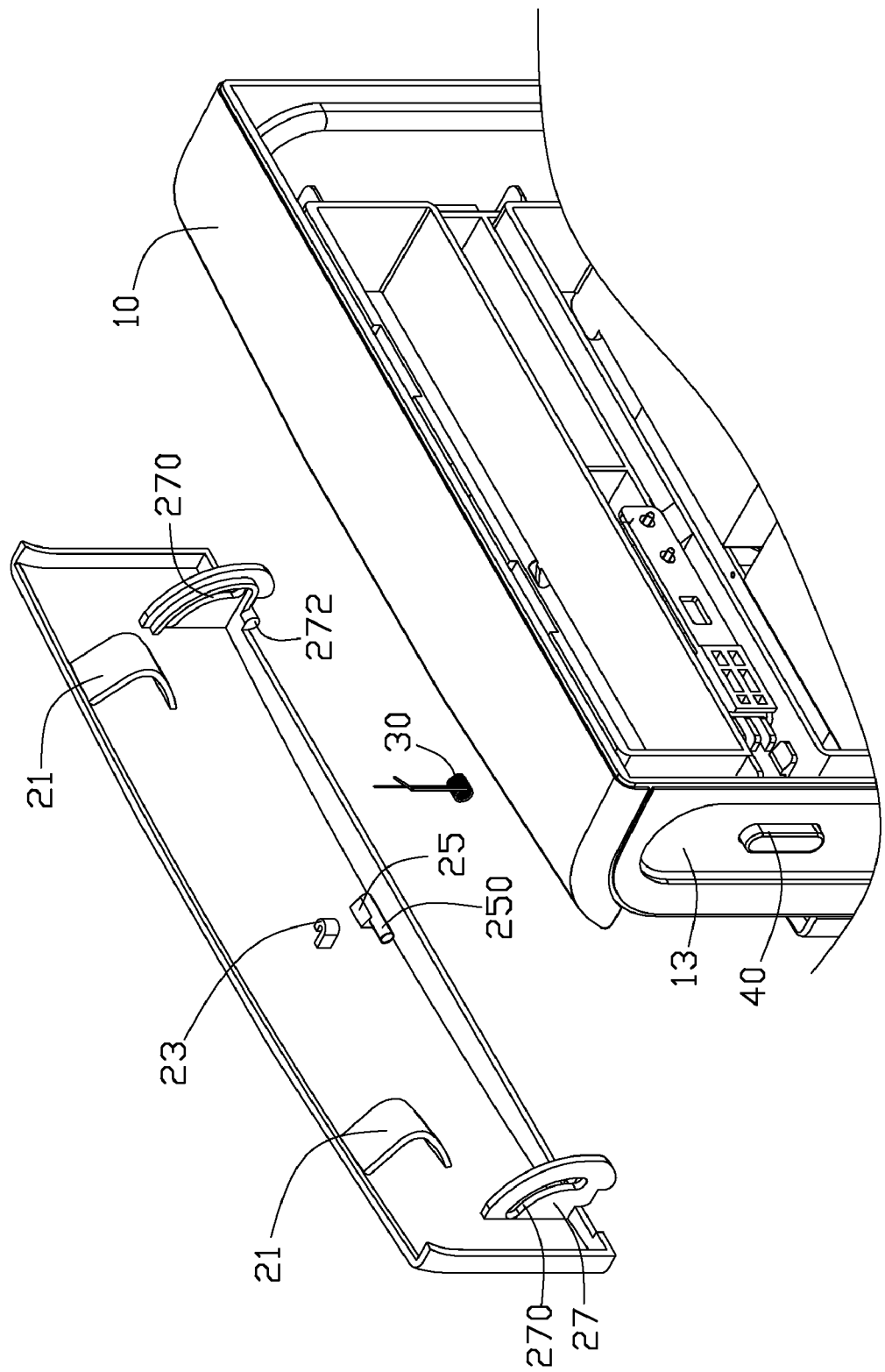
FIG. 2 is an enlarged isometric view of FIG. 1, but viewed from another aspect.

Referring to FIG. 2, the cover 20 includes a pair of spaced arcuate protrusions 21 extending from an inner side thereof. A bent portion 23 extends from the cover 20 between the protrusions 21. The inner side of the cover 20 forms a cover tab 25 below the bent portion 23. A cover post 250 extends from the cover tab 25 parallel to the cover 20. A pair of fixing plates 27 vertically extends from the cover 20 adjacent two ends thereof. Each fixing plate 27 has an arcuate contour. An arcuate groove 270 is defined in each fixing plate 27. Two pivot shafts 272 respectively extend perpendicularly from the bottoms of the fixing plates 27 toward each other.

Figure 3:
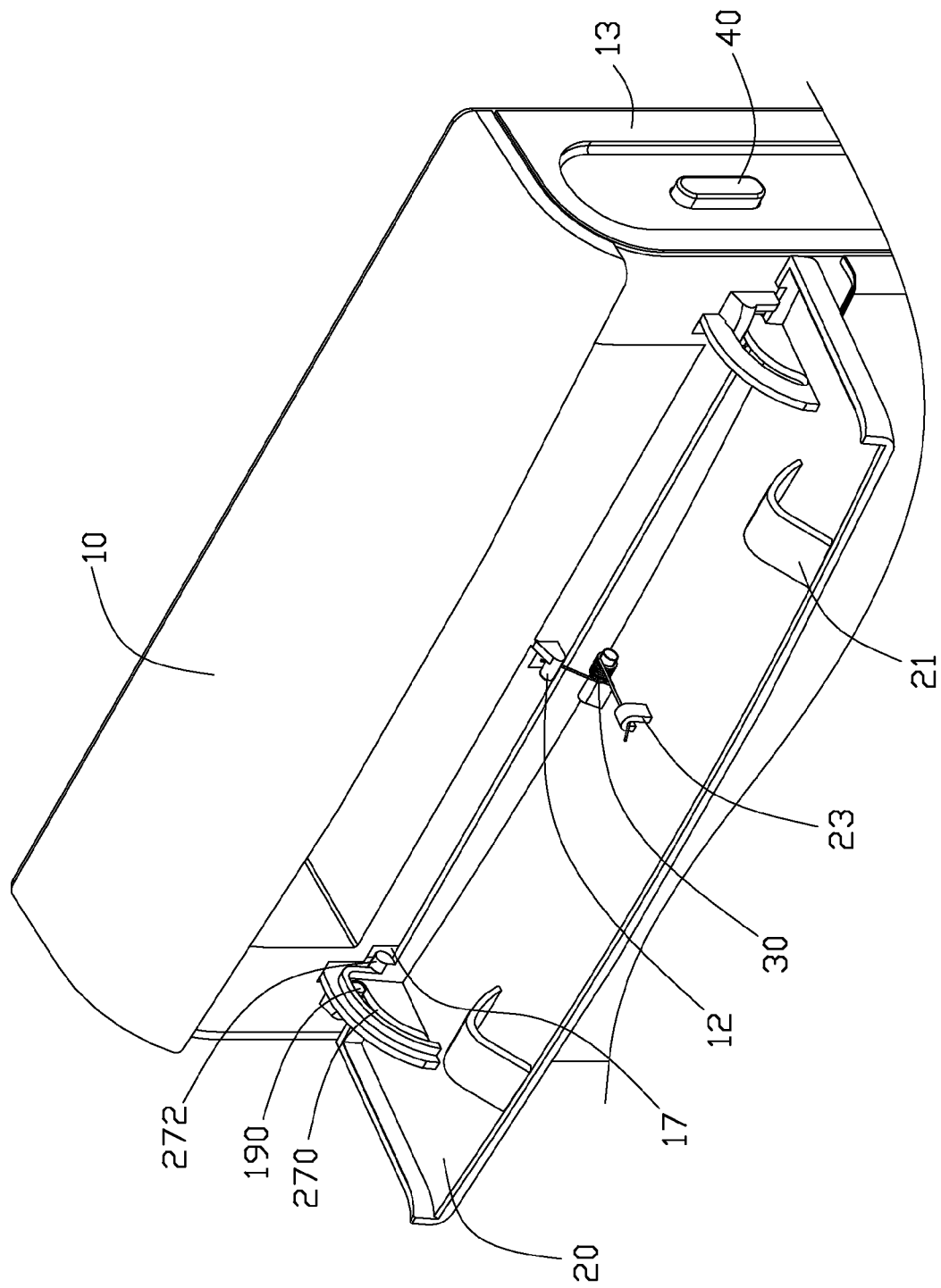
FIG. 3 is an assembled view of FIG. 1.

Referring further to FIG. 3, the elastic member 30 is placed around the cover post 250 of the cover tab 25 of the cover 20, and one end of the elastic member 30 is fixed to the bent portion 23. The fixing plates 27 of the cover 20 are rotatably received in the slots 15 of the bezel 10, and the pins 190 are received in the sliding grooves 270 of the fixing plates 27 respectively. The other end of the elastic member 30 is fixed to the bezel post 12 of the bezel 10. The elastic member 30 is then in a slightly deformed state thus urging the cover 20 to stay in place covering the opening 11 of the bezel 10.

To open the cover 20, the button 40 is pushed to trigger a switch of the device. A movable part of the device extends out of the opening 11 of the bezel 10 causing the protrusions 21 to push the cover 20 open. When the cover 20 rotates around the pins 190 of the bezel 10, the pivoting shafts 272 of the fixing plates 27 abut against the inside surface of the depressed portions 17 of the bezel 10 and rotate together with the cover 20. When the movable part of the device is retracted, the elastic element 30 restores, urging the cover 20 to cover the opening 11 of the bezel 10.

In other embodiments, the elastic element 30 can be a pair of coil springs. One end of each coil spring is fixed to the bottom of the corresponding fixing plate 27 of the cover 20, the other end is fixed to the backside of the bezel 10.

What is claimed is:

1. A cover assembly comprising:
    a bezel comprising:
        an opening defined therein for accessing a device;
        a pair of slots defined adjacent opposite ends of the opening respectively;
        a pair of depressed portions defined therein and communicating with the slots respectively;
        a pair of pins formed adjacent the slots respectively; and
    a cover for covering the opening of the bezel comprising:
        a pair of fixing plates formed thereon slidably received in the slots of the bezel, each of the fixing plates defining an arcuate groove that slidably receives the corresponding pin of the bezel, a pair of pivot shafts extending from the fixing plates respectively;
    wherein when the cover is pivoted open and shut around the pins, the pivot shafts abut against the corresponding depressed portions.

2. The cover assembly as claimed in claim 1, wherein the cover further comprises a post that is located on the inside of the cover;
    an elastic member comprising a coil and two ends, the coil is located around the post, and the two ends are fixed to the cover and the bezel.

3. The cover assembly as claimed in claim 2, wherein the bezel forms a post below the opening, the inner side of the cover forms a bent portion, the ends of the elastic member are fixed to the post and the bent portion respectively.

4. The cover assembly as claimed in claim 1, wherein the inner side of the cover forms a pair of spaced protrusions.

5. The cover assembly as claimed in claim 1, wherein the fixing plates are vertical to the cover, and the pivot shafts are perpendicular to the corresponding fixing plates.

6. A cover assembly comprising:
- a bezel comprising:
  - an opening defined therein along a front-to-back direction communicating external space and internal space of the bezel;
  - a pair of slots defined therein at two opposite sides of the opening, along the front-to-back direction;
  - a pair of depressed portions defined adjacent the slots respectively;
  - a pair of pins formed thereon; and
- a cover for covering the opening of the bezel comprising:
  - a pair of fixing plates integrally formed thereon and slidably received in the slots of the bezel in said front-to-back direction, each of the fixing plates defining an arcuate groove that slidably receives the corresponding pin of the bezel, a pair of pivot shafts extending from the fixing plates respectively;
- wherein when the cover is pivoted open and shut around the pins, the pivot shafts abut against the corresponding depressed portions.

7. The cover assembly as claimed in claim 6, wherein the fixing plates are vertical to the cover, and the pivot shafts are perpendicular to the corresponding fixing plates.

\* \* \* \* \*